Figure 1:
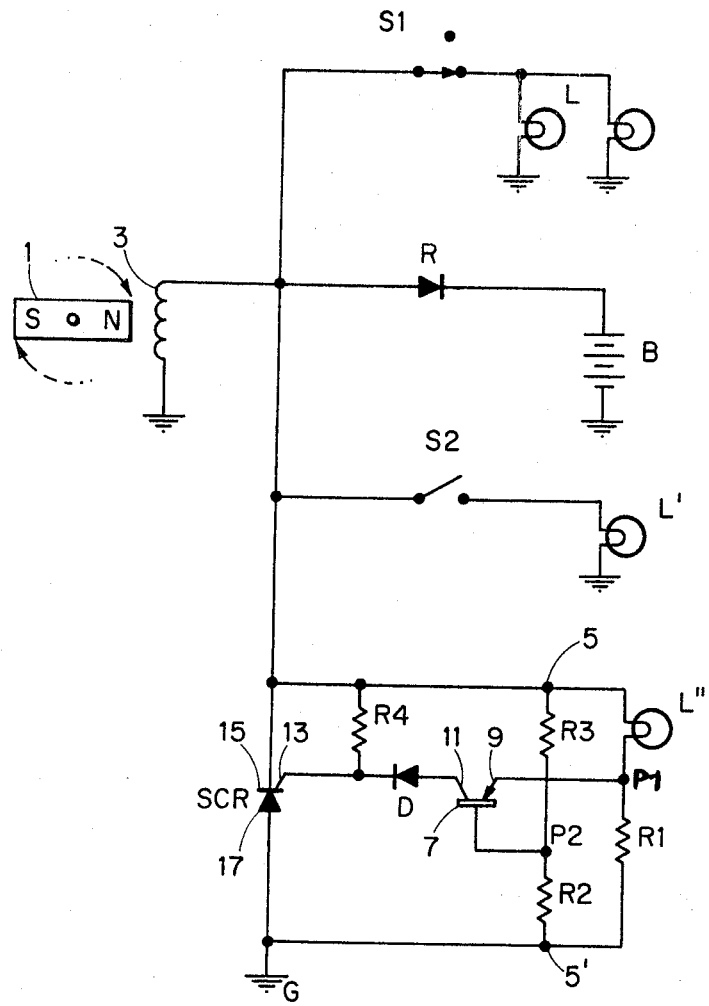

United States Patent [19]
Minks

[11] 3,755,709
[45] Aug. 28, 1973

[54] VEHICULAR LIGHTING SYSTEM REGULATOR AND THE LIKE

[76] Inventor: Floyd M. Minks, Rt. No. 1, Box 66, Kissimmee, Fla.

[22] Filed: Sept. 27, 1971

[21] Appl. No.: 184,080

[52] U.S. Cl.............. 315/82, 240/7.1 A, 315/78, 315/79, 317/19, 323/22 SC, 323/37
[51] Int. Cl. .................. B60q 1/02, H02h 3/42
[58] Field of Search............ 307/202, 252 H, 252 J, 307/252 M, 252 W, 257, 297; 315/78, 79, 82; 323/8, 22 SC, 37, 75 H, 75 N, 81; 240/7.1 A; 317/19

[56] References Cited
UNITED STATES PATENTS
3,129,378   4/1964   Raven et al.................. 307/297 X
3,149,224   9/1964   Horne et al................... 307/297 X Primary Examiner—Roy Lake
Assistant Examiner—Lawrence J. Dahl
Attorney—Rines and Rines

[57] ABSTRACT

This disclosure relates to the regulation of vehicular lighting systems involving permanent magnet alternators and the like for energizing the lighting system and which are subject to variations in frequency, voltage amplitude and/or waveform of the current that is produced from the alternator. In accordance with the disclosure, novel circuit connections are employed including the grounding of a regulator SCR switching rectifier anode used with a bridge circuit comprising an incandescent lamp or similar power sensing element, to safeguard against the short-circuiting of components and, in addition, to provide compatible operation with those systems that require battery charging from the alternator, though the system of the invention is also applicable with self-starting apparatus.

10 Claims, 2 Drawing Figures

3,755,709

INVENTOR
FLOYD M. MINKS

BY *Rines and Rines*

ATTORNEYS

VEHICULAR LIGHTING SYSTEM REGULATOR AND THE LIKE

The present invention relates to vehicular power supply systems embodying permanent magnet alternators and the like for energizing lighting systems associated with the vehicles, being more particularly concerned with systems in which there may be a rather wide variation of frequency, voltage amplitude and/or waveform in the generated current that is to be used to energize the lighting system, such that regulation is required.

As disclosed in my co-pending application, Ser. No. 817,787 filed Apr. 21, 1969 for Power Supply Regulator, motor vehicles of the snowmobile and related types have generally been provided with lighting systems operated from engine-driven alternator sources of alternating-current voltage and thus subject to the wide variations in frequency, voltage amplitude and waveform resulting during variation of engine speed. Proposals for providing regulation so as to assure more uniform illumination of the lighting system with widely varying engine speeds have accordingly been made, including that of my said copending application in which an incandescent tail lamp or other lamp of the vehicle is used as a power-sensing element, the impedance of which varies in accordance with power that exceeds a predetermined desired operating power, generating control signals in response thereto that affect, through an SCR or similar control circuit, the flow of power from the alternator, as by short circuiting the same until the supplied power is reduced to the desired predetermined operating value, such that the root mean square of the voltage supplied to the lighting system remains substantially constant.

While this system has been found to work admirably well in practice, it has proven excessively lossy and inefficient in those instances where larger-wattage tail lights have been installed for increased visibility purposes — such incandescent lamps being inefficient power-sensitive impedance elements for the regulating purposes required. In addition, considerable power loss occurs as a result of the operation of the SCR with those circuit connections. Systems of that type, furthermore, are not compatible with existing lighting systems using battery charging circuits, and inherently do not provide power-sensitive controlling impedances apart from the vehicular lights, such that the alternator cannot simultaneously energize the regulating system, the head lamps, the tail lamps and the brake lights, when applied.

It is thus an object of the present invention to provide a new and improved power supply regulator system for such vehicular and other systems that shall not be subject to the above-described limitations, but that, to the contrary, provides substantial advantages thereover, including adaptability to use in systems with or without battery charging circuits; vastly reduced power losses; simultaneous alternator energization of the regulator and the vehicle lights; and since, in accordance with the present invention, the power-sensing impedance is a separate lamp from the tail lamp and its illunination is not used, as such, this impedance lamp may be operated at a much lower level, producing longer life of the filament and eliminating the possibility of a tail-light burn-out effectively turning off the head lamps.

A further object is to provide a novel power-supply regulating system of more general utility, as well.

Other and further objects will be explained hereinafter and are more particularly delineated in the appended claim. In summary, the invention, from one of its aspects, contemplates in a lighting system, a current-producing source the frequency, voltage amplitude and waveform of which may vary from time to time, correspondingly varying the power produced thereby, and one terminal of which is grounded; lighting means connected to be energized by power supplied from the source; an electrical network also connected to be energized by the source and comprising a power-sensitive impedance element separate from said lighting means and the impedance value of which varies with the power supplied thereto, the network being adjusted to produce in response to impedance variation of the power-sensitive impedance element predetermined control signals when the power supplied thereto exceeds a predetermined desired operating power, and a grounded electronic switch control means responsive to said control signals for grounding out part of the power from the source to the lighting means through said switch until the said supplied power is reduced to the said predetermined operating power, such that the root mean square of the voltage supplied to the lighting means remains substantially constant.

The invention will now be described with reference to the accompanying drawing, the single FIGURE of which is a schematic circuit diagram illustrating the invention in preferred form.

Referring to the drawing, an alternator is schematically shown at 1, as of the type used on snowmobiles or other vehicles and the like, generating alternating current in a stator winding 3 in order to supply energizing power, when a switch S1 is closed, as illustrated, to illuminate head lights and tail lights, schematically represented by the lamps L. Though the invention is equally applicable to self-starting systems, in the illustration herein presented, the alternator is adapted to recharge a vehicular battery B through a rectifier R, as is well known. In addition, the power from the alternator system 1–3, upon the depressing of the brake peddle, schematically illustrated by the switch S2, may illuminate the brake lights, indicated at L'.

At this point, it should be noted that leaving the various lights on with the engine operating at low rpm cannot discharge the battery B as happens in systems where the lights are hooked directly to the battery. It should also be noted that the system of the invention can function with the battery B disconnected. It had been a common problem with, for example, snowmobiles, upon the discharging of the battery, that the battery would freeze and crack at the temperatures involved, thus effectively becoming an open circuit and producing a higher than desired voltage on the lamps, causing premature lamp failure.

In accordance with the present invention, a power-sensitive impedance element, shown as a separate small tungsten incandescent lamp L'', is connected as an arm of a bridge-type network having its upper input terminal 5 connected to the upper terminal of the stator winding 3 of the alternator, and its lower input terminal 5' grounded at G. The bridge network involves as other arms, resistors R1, R2 and R3, with the output from intermediate output terminals P1 and P2 being shown applied respectively to the emitter 9 and base 7 of a transistor amplifier. The collector output of the amplifier at 11 is fed through a diode D, which protects the transistor during the portion of the alternating-current cycle when the alternator output is positive with respect to ground, to the trigger electrode or gate 13 of a switch, illustrated as a solid-state SCR rectifier control device, so labeled. The cathode 15 of SCR is connected to the upper input terminal 5 of the bridge and to the upper terminal of the alternator transformer 3, and the anode 7 is connected to the ground terminals 5'-G. A resistor R4 is shown connected from the gate or trigger electrode 13 of SCR to the cathode 15, producing more stable operation with some types of SCR's at elevated temperatures.

As is well known, a tungsten filament lamp exhibits an impedance which rises with the temperature and thus with the root mean square value of the voltage impressed thereupon. The values of the fixed resistors R1, R2, R3 in the bridge are so selected that, at the desired operating voltage, the relationship between the impedance R1 and the impedance of the lamp L″ will be the same as that between the impedance R2 and R3, neglecting the relatively small voltage required between the base 7 and emitter 9 of the transistor. Thus, during the portion of the alternating current waveform generated at 3 when the output is negative with respect to ground, the transistor will be biased off provided the rms voltage applied to the lamp L″ is lower than the predetermined desired value; and it will be biased on if the rms value of this voltage corresponds to a level above such desired level. The biasing of this transistor on, will cause conduction of current from its collector 11 to the gate 13 of SCR, thus turning on SCR and shorting out a portion of the negative cycle of the current from the alternator winding 3, reducing the rms voltage to the desired level. Note that since this control is effected on the negative half cycle, interaction with the charging of the battery B, if indeed present, is minimized. It should further be pointed out that this control is not necessarily a pure phase control. One cycle, for example, may have a portion clipped, and the succeeding cycles may be left at full amplitude, with the process then repeated. In all instances, however, the adjustment of the bridge arms R1, R2, R3, L″, is such as to produce, in response to impedance variation of the power-sensitive incandescent lamp impedance L″, predetermined contro' signals whenever the power applied thereto exceeds the predetermined desired operating power for the vehicular lamps L. The SCR switching rectifier device acts as a control means that is responsive to these control signals for controlling the flow of power from the alternator source 1-3 to the lighting system L until the supplied power is reduced to the desired predetermined operating power, as just described. In this manner, the root mean square of the voltage that is supplied to the lights L remains substantially constant, irrespective of change in engine speed or other factors that may vary the frequency, amplitude or waveform of the current generated in the alternator stator winding 3. It should be noted, also, that below the engine speed where sufficient energy is available for full energization of the lamps L, this control circuit draws negligible power, such as approximately one watt, in a typical case. This is a great advantage over such techniques as zener diodes or other regulating devices which start to reduce the power to the lamps even before their full brilliance is obtained. Also, since the control is supplied by the SCR switching device, a relatively small amount of power is dissipated compared to the amount of power being controlled. Typically, an SCR dissipating 6 watts can control a lighting system normally operating at 75 watts. This not only reduces the cost of the components involved, but increases their reliability, particularly under conditions where one or more lamps may be removed from their sockets or otherwise burned out.

While the system disclosed in my said co-pending application also involves the use of power-sensitive impedance circuits (using as the incandescent-lamp power-sensitive impedance element, for example, the tail lights, as before discussed) and also SCR switching circuits, the present invention involves rather radical departures from the concept which, indeed, seemed contra-indicated by the techniques known in the prior circuit. Specifically, in accordance with the present invention, the separate small lamp L″ is employed and the anode 17 of the SCR switching control circuit is grounded. This did not seem feasible in connetion with circuits of the prior application inasmuch as when the tail lights were used, it was highly desirable to have one side of the tail lamp grounded, simplifying both the wiring and the socket. Several advantages, however, arise from the different connections of the present invention. First, the unit is readily adaptable to snowmobiles already in the field regardless of what type of tail light may be used, and irrespective of its voltage or its wattage. The present unit has only two leads, one of which is the ground G, with the other 'ead terminal 5 being adapted for direct connection into the existing lighting system without further modification of its wiring. Since the anode of commercially available silicon-controlled rectifiers is generally connected to the case, which must also serve as the heat sink, this new design eliminates the necessity for electrically isolating the anode, while at the same time supplying a low thermal impedance path from the anode to the large heat sink residing in a grounded portion of the vehicle itself. In the previous circuits, moreover, a short circuit from the tail light terminal to ground, particularly if the head lights were switched out of the circuit or otherwise removed, would result in the regulator drastically increasing the voltage in the system, often to a point that was destructive of components in the regulator itself. This problem is also eliminated in accordance with the invention since this terminal is not available externally to the generally potted regulator module. An additional advantage of the invention resides in the fact that the entire regulator can be calibrated, as by selecting the value of R1, to the individual lamp L″, thus giving a much more accurate control over the voltage than could be done if the unit were simply calibrated to the design or typical value of the range of lamps that are used in tail-light sockets.

In addition, the circuits of my prior application were not adapted to be used with alternators that charged batteries from the same alternator winding. It has fortuitously occurred that with the different circuit connections of the present invention, complete compatibility with such battery-charging circuits has for the first time been attained. In addition, simultaneous compatible operation of the brake light system has resulted, since the grounding of the anode 17 of the control switching rectifier SCR occurs on the negative half wave of the alternator current; whereas the battery is charged by the positive half-wave, it being standard practice to ground the negative terminal of the battery. Since, furthermore, all of the bridge control network is contained within the small regulator case, there is much less chance of stray electro-magnetic interference causing improper operation. Such interference could be picked up in the previous designs on the leads extended to the tail lamp, this interference originating from the ignition system of the vehicular engine. The circuit of the present invention therefore does not require the bypass capacitors used in the prior art.

The system of the invention, in view of its novel connections, moreover, may be readily physically constructed with a copper mounting tab serving as a ground and heat sink, and, with the metal portion of the SCR anode directly held in physical and electrical contact with one side thereof, and with the other side of the tab mounted to the non-circuit side of a printed circuit board, with the leads of the SCR extending through the board. This construction provides a particularly small and compact package which can be economically constructed while allowing minimal thermal impedance between the SCR anode and the mounting tab, which transfers the heat produced to a chassis portion of the vehicle to which it is bolted, thus allowing the use of a smaller SCR and lower operating temperatures and producing both greater reliabi'ity and greater economy in the components selected. Highly successful regulation has been obtained in circuits of this construction using 60 watt G. E. 4966 sealed beam lamps L, regulation being initiated upon the reaching of slightly under 14 volts with an engine speed of about 2,700 rpm, the regulation continuing within about ± 0.1 volt up to over 10,000 rpm.

Figure 2:
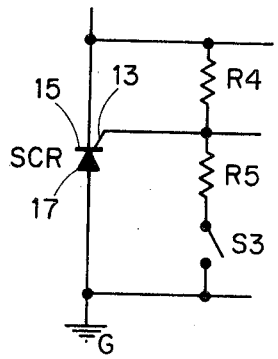

There are some instances in which the circuit modification of FIG. 2 may be incorporated for the purpose of producing a minimal illumination of standby heating of the filaments of the lamps L while the lights are nominally turned off, thus preventing vibration from causing fatigue failure of the filaments. This type of circuitry would generally be used on vehicles which do not have a battery, since it would prevent or greatly reduce the charging of the battery. A switch S3 is placed in series with resistor R5 connected from the gate of the SCR to ground. When the switch is closed, current can thus flow from the anode of the SCR to the gate at any time that the anode tends to go positive, thus turning on the SCR and producing a very high level of illumination of the lamps, not only because the pulse of that polarity is short-circuited, but because the internal impedance of the alternator is primarily inductive. The phase of the alternator is shifted so as to minimize the time duration of the pulse of the opposite polarity. Since the lamp L'' does not have to supply visible illumination, moreover, as is involved where the power-sensitive impedance was simultaneously the tail lamp itself, the lamp L'' can be operated at a voltage corresponding to a theoretical life of several hundred thousand hours, almost eliminating the possibility of a burn-out of this lamp. In addition, the lamp L'' protects the rest of the lighting system from failure from physical breakage of the tail lamp such as in practice often happens as a result of a vehicle being bumped or pushed from the rear by another similar vehicle.

Further modifications will also occur to those skilled in this art and all such are considered to fall within the spirit and scope of the invention as defined in the appended claims.

What is claimed is:

1. In a lighting system, a current-producing source the frequency, voltage amplitude and waveform of Which may vary from time to time correspondingly varying the power produced thereby and one terminal of which is grounded, lighting means connected to be energized by power supplied from the source, an electrical network also connected to be energized by the source and comprising a power-sensitive impedance element separate from said lighting means and the impedance value of which vaires with the power supplied thereto, means for producing in response to impedance variation of the power-sensitive impedance element predetermined control signals when the power supplied exceeds a predetermined desired operating power, and electronic switch control means responsive to said control signals for grounding out power from the source of the lighting means through said switch control means until the said supplied power is reduced to the said predetermined operating power, such that the root mean square of the voltage supplied to the lighting means remains substantially constant.

2. A lighting system as claimed in claim 1 wherein the said power-sensitive impedance element comprises an incandescent lamp.

3. A lighting system as claimed in claim 1 wherein the said current-producing source comprises an alternator.

4. A lightIng system as claimed in claim 3 wherein the said alternator, the lighting means, the network and the control means are all connected in parallel.

5. A lighting system as claimed in claim 3 and in which a rectifying battery-charging circuit is connected in parallel with said alternator.

6. A lighting system as claimed in claim 3 and in which said network comprises a bridge having an input and an output and containing said impedance element as one arm with the remaining arms comprising resistive means, said electronic switch control means comprising gated SCR means having anode, cathode and gate electrodes and means for connecting said anode and cathode across the alternator in parallel with said bridge input and with the anode connected to the grounded terminal thereof, said control signals producing means comprising means for connecting the said bridge output to the said gate electrode.

7. A lighting system as claimed in claim 6 and in which said bridge output connecting means comprises a transistor amplifier and diode means.

8. A lighting system as claimed in claim 6 and in which means is provided connectable to said gate electrode for providing bias thereto to enable standby current to flow through said lighting means when nominally extinguished.

9. A lighting system as claimed in claim 6, further comprising a battery-charging circuit including a battery connected in series with a rectifier across the altenator, the rectifier being oppositely poled with respect to the SCR means so as to pass current of polarity opposite to that passed by the SCR means between its cathode and its anode.

10. In a lighting system, a current-producing alternator the frequency, voltage amplitude and waveform of which may vary from time to time correspondingly varying the power produced thereby and one terminal of which is grounded, lighting means connected to be energized by power supplied from the alternator, means including a root mean square voltage sensitIve electrical network also connected to be energized by the alternator for producing predetermined control signals when the power supplied exceeds a predetermined desired operating power, gated SCR means having anode, cathode and gate electrodes, means for connecting said anode and cathode across the alternator with the anode connected to the grounded terminal thereof, means connecting said control signals to the gate electrode of said SCR means for grounding out power from the alternator to the lighting means through said SCR means until the said supplied power is reduced to the said predetermined operating power, such that the root mean square of the voltage supplied to the lighting means remains substantially constant, and a battery charging circuit including a battery connected in series with a rectifier across said alternator, the rectifier being poled oppositely to the SCR means so as to pass current of polarity opposite to that passed by the SCR means betwzen its cathode and its anode.

* * * * *